United States Patent
Wang et al.

(10) Patent No.: US 8,567,733 B2
(45) Date of Patent: Oct. 29, 2013

(54) LOCKING MODULE AND SUPPORT STAND FOR DISPLAY DEVICE USING THE SAME

(75) Inventors: Jin-Xin Wang, Shenzhen (CN);
Lian-Cheng Huang, Shenzhen (CN);
Jian Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 906 days.

(21) Appl. No.: 12/489,615

(22) Filed: Jun. 23, 2009

(65) Prior Publication Data

US 2010/0108830 A1 May 6, 2010

(30) Foreign Application Priority Data

Nov. 5, 2008 (CN) .......................... 2008 1 0305390

(51) Int. Cl.
*A47B 96/06* (2006.01)
(52) U.S. Cl.
USPC ............ 248/220.21; 248/220.22; 248/221.11; 411/552; 411/553; 411/549; 411/349
(58) Field of Classification Search
USPC ................... 248/158, 205.1, 220.21, 220.22, 248/221.11, 222.52, 223.41, 225.11, 248/346.01; 16/2.1, 221, 231; 244/131; 411/34, 552, 553, 549, 349, 409; 403/408.1, 409.1; 292/66; 410/77, 80, 410/83
See application file for complete search history.

(56) References Cited

U.S. PATENT DOCUMENTS

| | | | | |
|---|---|---|---|---|
| 2,368,799 A * | 2/1945 | Barlow | ......................... | 411/552 |
| 3,169,293 A * | 2/1965 | Neuschotz | .................... | 411/552 |
| 3,991,968 A * | 11/1976 | Yazejian | ...................... | 248/501 |
| 5,370,488 A * | 12/1994 | Sykes | ............................ | 411/551 |
| 6,267,543 B1 * | 7/2001 | David et al. | .................... | 411/552 |
| 6,338,649 B1 * | 1/2002 | Smith | ............................ | 439/504 |
| 6,659,513 B1 * | 12/2003 | Ramsauer | ...................... | 292/66 |
| 6,905,099 B2 | 6/2005 | Sung | | |
| 7,866,928 B2 * | 1/2011 | Schmitz | .......................... | 411/34 |
| 8,333,605 B2 * | 12/2012 | McQuilken et al. | .......... | 439/332 |
| 8,365,357 B2 * | 2/2013 | Huang et al. | .................... | 16/303 |
| 2005/0220568 A1 * | 10/2005 | Fink | .............................. | 411/553 |
| 2011/0215203 A1 * | 9/2011 | Rose et al. | ..................... | 244/131 |

FOREIGN PATENT DOCUMENTS

| | | |
|---|---|---|
| TW | 585288 | 4/2004 |
| TW | 200625946 | 7/2006 |
| TW | M298855 | 10/2006 |
| TW | 200841731 | 10/2008 |

\* cited by examiner

*Primary Examiner* — Todd M. Epps
(74) *Attorney, Agent, or Firm* — Altis & Wispro Law Group, Inc.

(57) ABSTRACT

A support stand for display device includes a base seat, an elevating support, and a locking module detachably connected the elevating support to the base seat. The locking module includes a fixing member, a rotating member, an elastic member, and a latching member. The fixing member is fixed on one of the base seat and the elevating support, and the fixing member defines a gap and a latching groove. The rotating member is rotatably extended through the other one of the base seat and the elevating support, and the fixing member. The elastic member is sleeved on the rotating member, and abuts on the fixing member. The latching member is fixed on an end of the rotating member. The latching member is extended through the gap of the fixing member, and is engaged in the latching groove of the fixing member.

8 Claims, 5 Drawing Sheets

LOCKING MODULE AND SUPPORT STAND FOR DISPLAY DEVICE USING THE SAME

BACKGROUND

1. Technical Field

The present disclosure generally relates to locking modules and support stands, particularly, to a locking module and a support stand used for a display device.

2. Description of Related Art

Display devices, such as liquid crystal display monitors, often stand on a flat surface using a support stand. A typical support stand includes an elevating support attached to a display device, and a base seat to mount the elevating support. Generally, the elevating support is mounted on the base seat with screws or latching hooks, or the elevating support is integrally formed with the base seat.

However, when the elevating support is screwed on the base seat, it is inconvenient to assemble or disassemble the typical support stand, because the screws need to be tightened or loosened one by one. When the elevating support is latched on the base seat, the typical support stand may have a poor structural strength, because the latching hooks may be easily damaged by an external force or abraded. When the elevating support is integrally formed with the base seat, the typical support stand may be inconvenient to carry or package, because the typical support stand occupies a relatively large space.

What is needed, therefore, is a locking module and a support stand for a display device that overcomes the limitations described.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
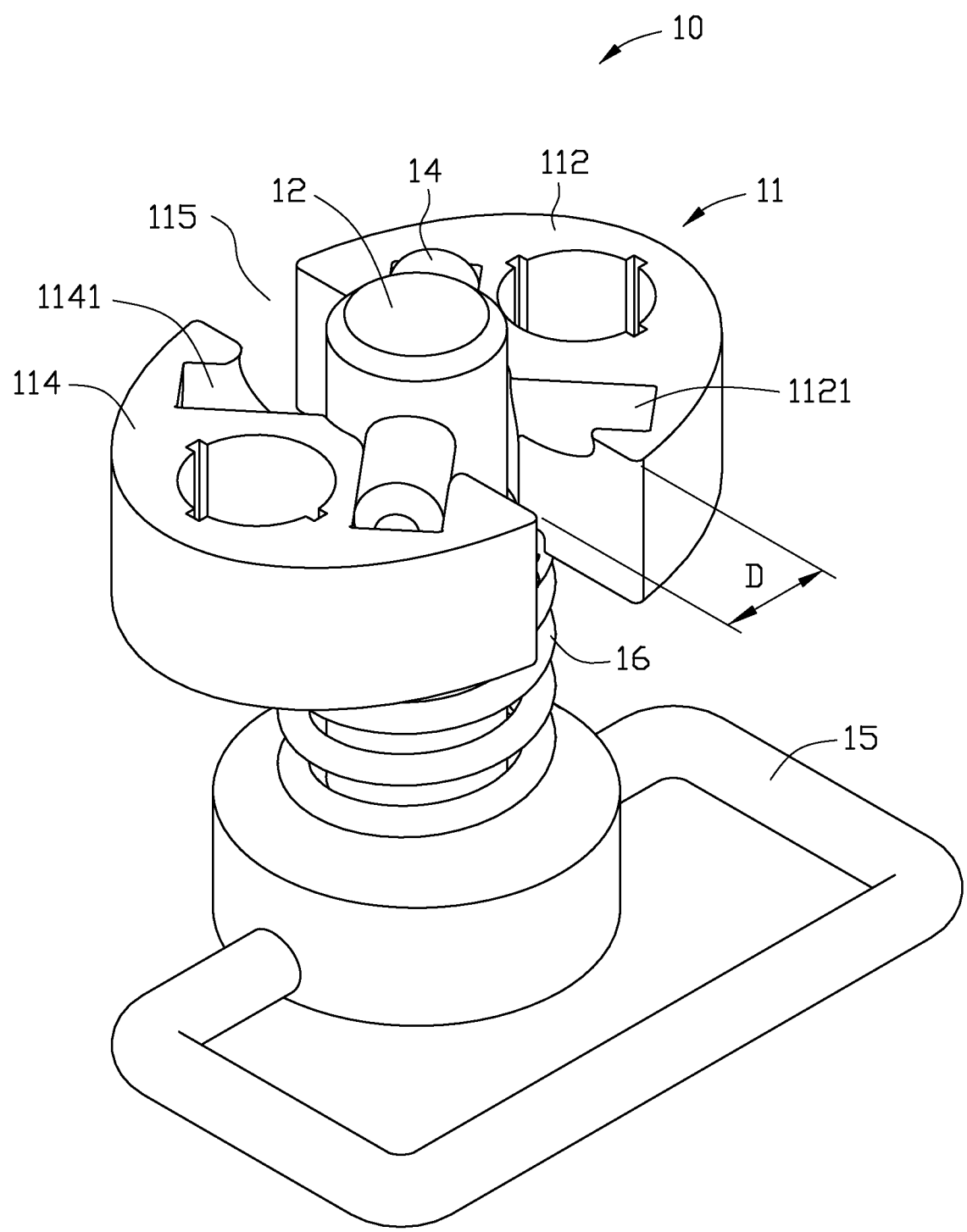
FIG. 1 is an assembled, isometric view of an embodiment of a locking module.

Referring to FIG. 1, an embodiment of a locking module 10 includes a fixing member 11, a rotating member 12 rotatably extended through the fixing member 11, a latching member 14 fixed on a first end of the rotating member 12, an operating member 15 fixed on a second end of the rotating member 12, and an elastic member 16 sleeved on the rotating member 12.

Figure 2:
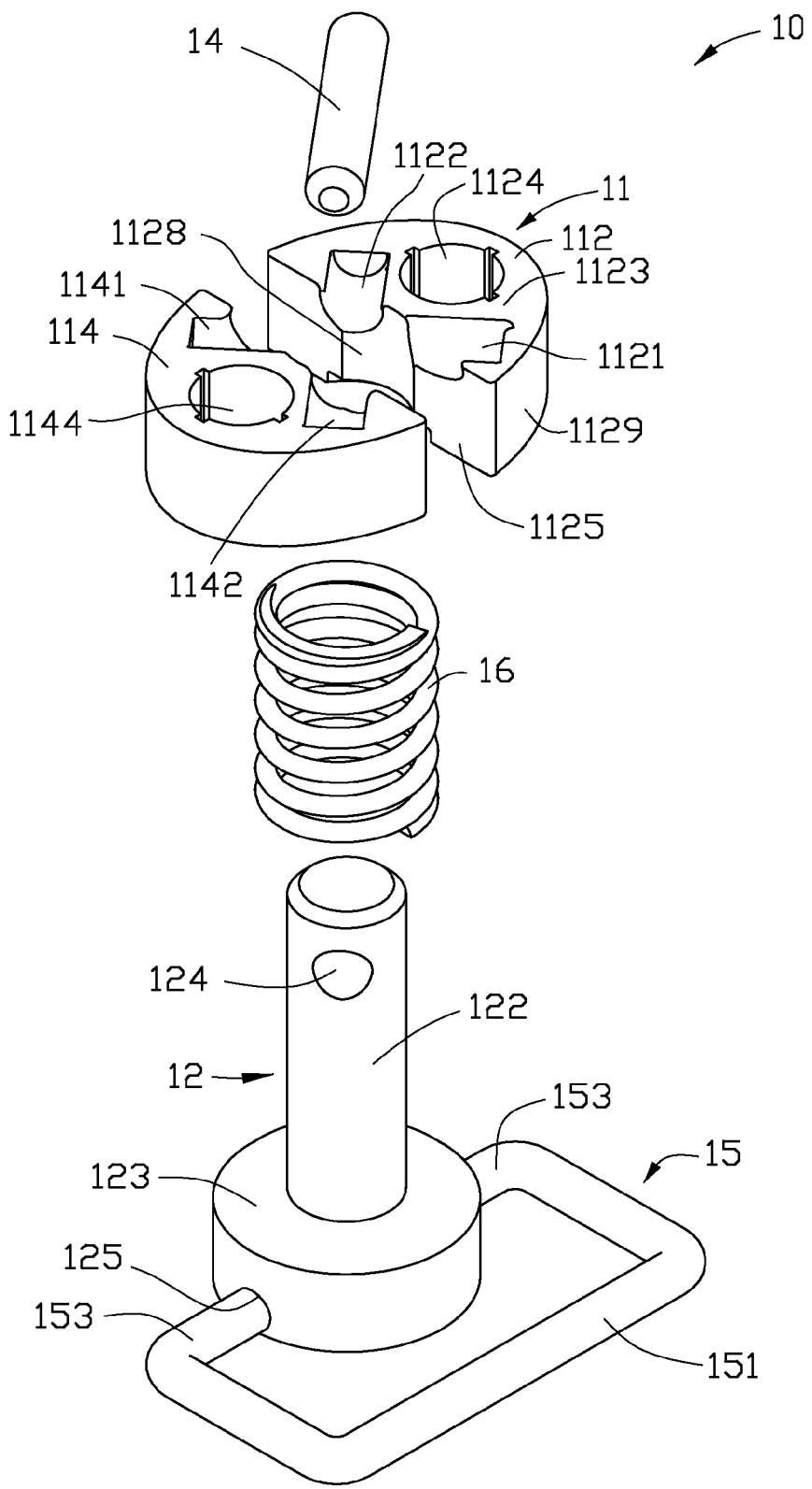
FIG. 2 is an exploded, isometric view of the locking module in FIG. 1.
Figure 3:
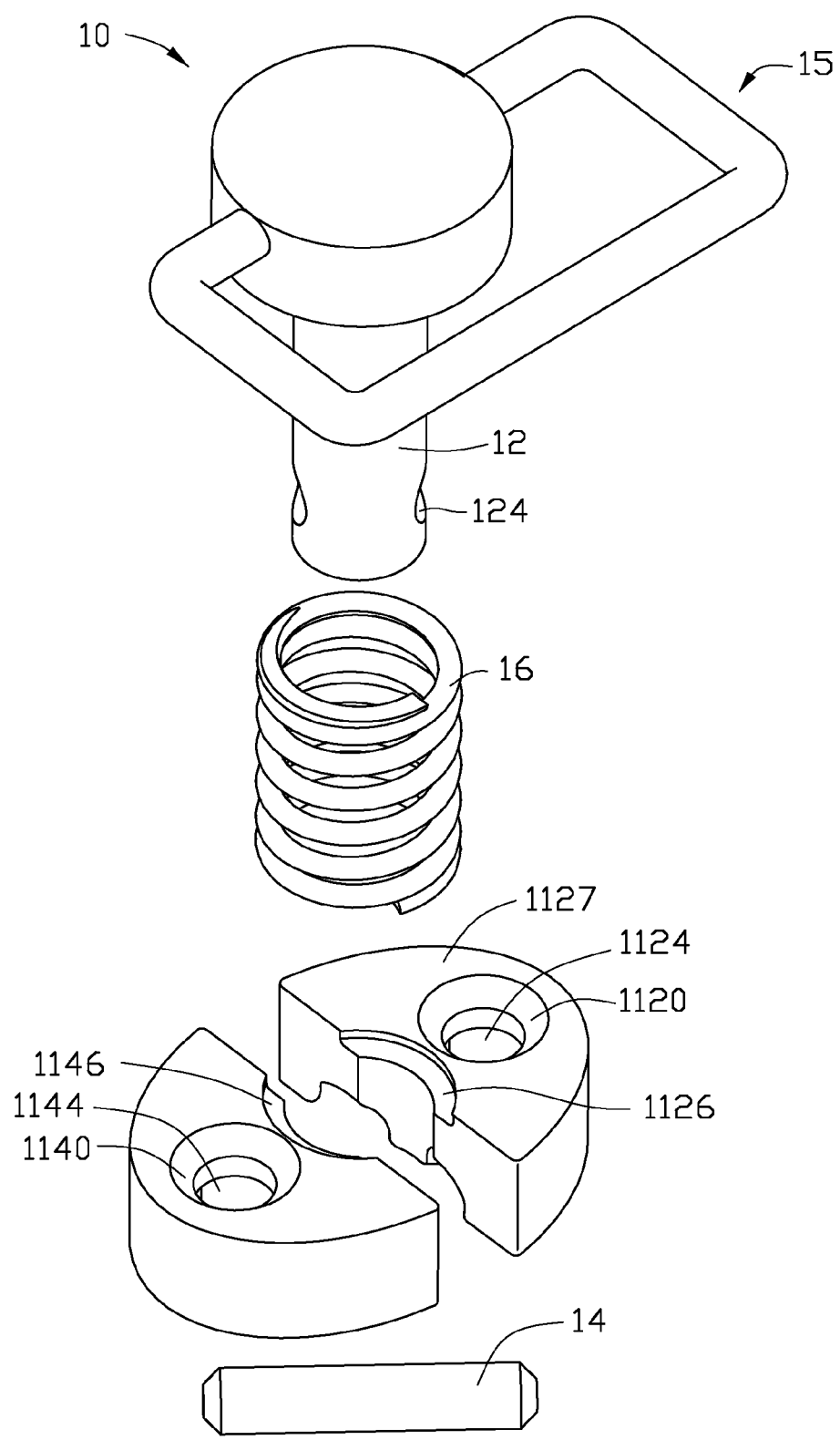
FIG. 3 is similar to FIG. 2, but viewed form another aspect.

Referring also to FIGS. 2 and 3, the fixing member 11 includes a first fixing block 112 and a second fixing block 114. Each of the first and second fixing blocks 112, 114 may be substantially semi-cylindrical. The first fixing block 112 includes a top surface 1123, a bottom surface 1127 opposite to the top surface 1123, a flat side surface 1125, and in the illustrated embodiment, a substantially cylindrical side surface 1129. The top surface 1123 defines two latching grooves 1121, 1122, and a mounting hole 1124 extending through the first fixing block 112. In the illustrated embodiment, the latching grooves 1121, 1122 may be substantially semicircular grooves. The extending direction of the latching groove 1121 may intersect perpendicularly with the extending direction of the latching groove 1122. The mounting hole 1124 may be a substantially circular through hole. The bottom surface 1127 defines a retaining groove 1120 communicating with the mounting hole 1124, and a positioning groove 1126. The positioning groove 1126 may be a substantially curved groove. The flat side surface 1125 defines a recessed portion 1128 having a curved surface corresponding to an outer surface of the rotating member 12.

The second fixing block 114 is similar in principle to the first fixing block 112, and defines two latching grooves 1141, 1142, a mounting hole 1144, a retaining groove 1140 communicating with the mounting hole 1144, and a positioning groove 1146. The latching groove 1141 is aligned with the latching groove 1121. The latching groove 1142 is aligned with the latching groove 1122. The positioning grooves 1126, 1146 cooperatively receive an end of the elastic member 16. The second fixing block 114 also defines a recessed portion (not shown) having a curved surface corresponding to an outer surface of the rotating member 12.

The rotating member 12 includes a rotating portion 122 and a flange 123 formed on an end of the rotating portion 122. The rotating portion 122 may be substantially cylindrical, and defines a substantially circular through hole 124 in an end away from the flange 123. The flange 123 defines an assembling hole 125 extending through the flange 123.

The latching member 14 extends through the through hole 124 of the rotating member 12, and may be substantially cylindrical.

The operating member 15 may be a substantially rectangular frame. A cross section of the operating member 15 may be substantially circular shaped. Two end portions 153 of the operating member 15 are rotatably engaged in the assembling hole 125 of the rotating member 12, so that the operating member 15 is rotatably connected to the rotating member 12. In alternative embodiments, the operating member 15 may have other shapes. In addition, the operating member 15 may be fixed on the rotating member 12, or integrally formed with the rotating member 12.

The elastic member 16 may be a helical spring, and rotatably sleeved on the rotating portion 122 of the rotating member 12. Alternatively, the elastic member 16 may be a plurality of spring washers, elastic rubber rings, or elastic cylinders.

Figure 4:
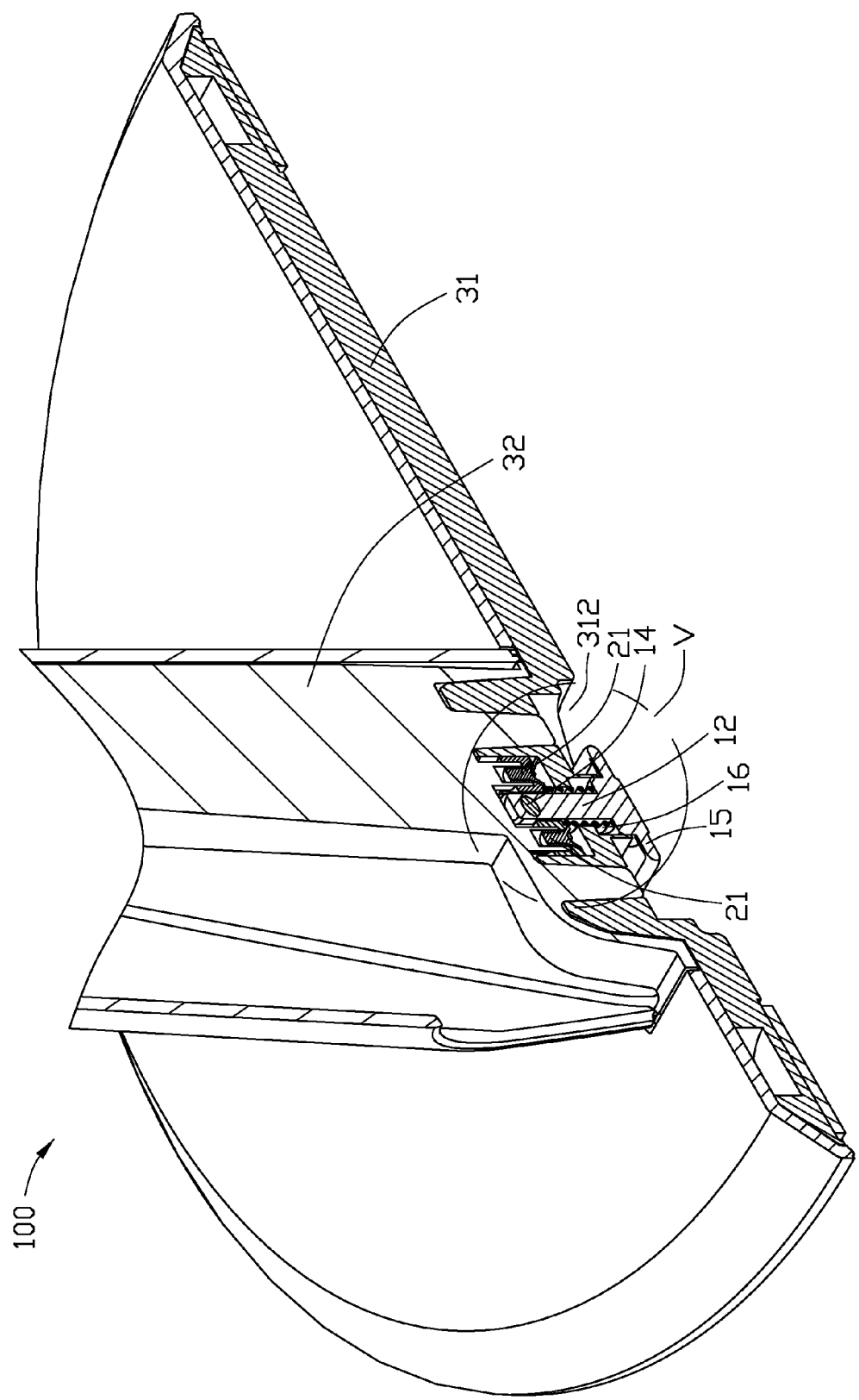
FIG. 4 is a cross-sectional view of an embodiment of a support stand and the locking module in FIG. 1.
Figure 5:
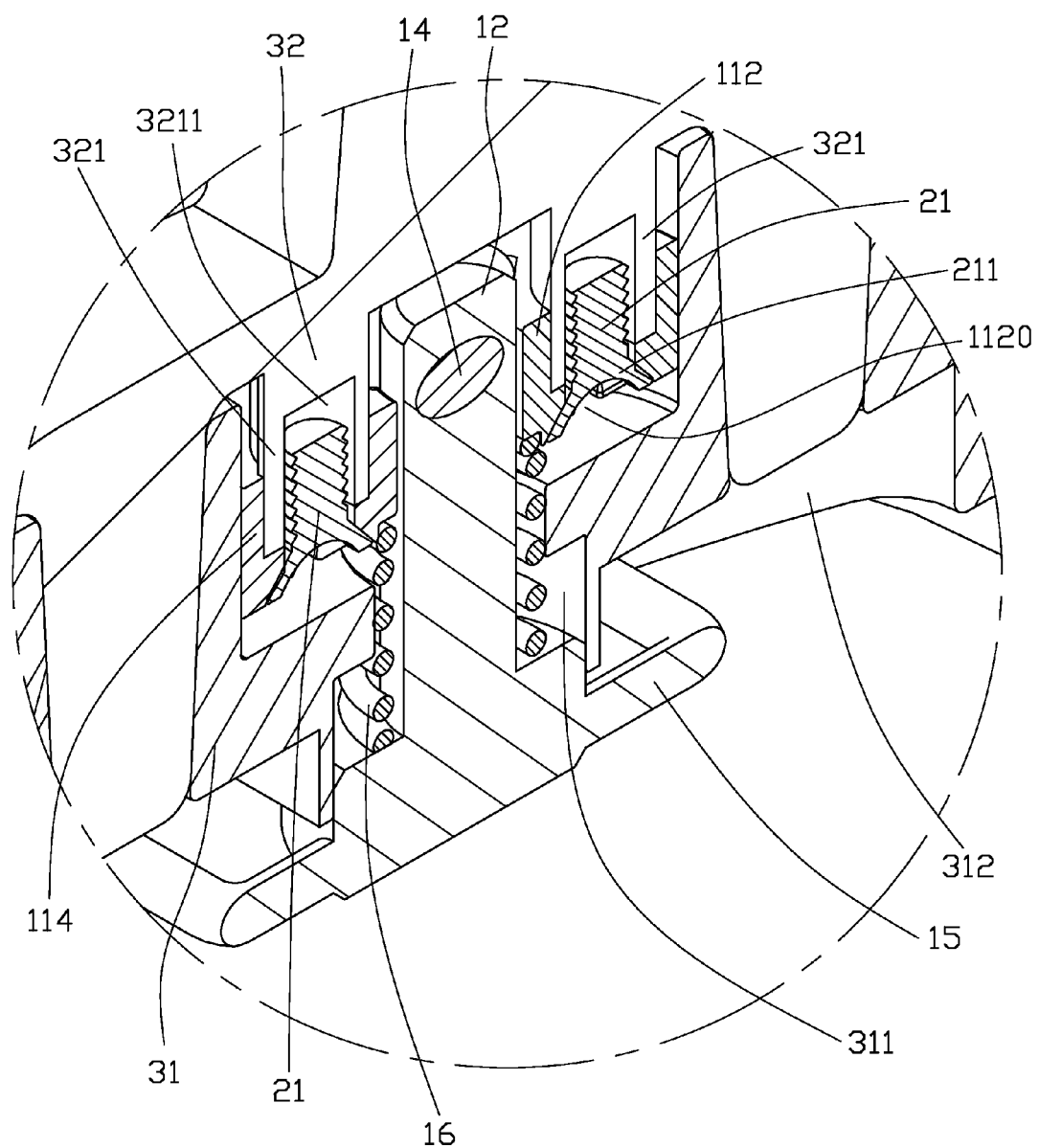
FIG. 5 is an enlarged view of a circled portion V in FIG. 4.

Referring also to FIGS. 4 and 5, the locking module 10 may be used in an embodiment of a support stand 100. The support stand 100 includes a base seat 31, and an elevating support 32 detachably assembled on the base seat 31 by the locking module 10.

The base seat 31 defines a receiving hole 311 to allow the rotating member 12, the elastic member 16, and the latching member 14 to pass through the base seat 31. The base seat 31 also defines a receiving groove 312 to receive the operating member 15.

The elevating support 32 forms two mounting poles 321. Each mounting pole 321 defines a threaded hole 3211 in a middle portion.

The support stand 100 further includes two threaded fasteners 21 to fix the fixing member 11 on the elevating support 32. Each threaded fastener 21 includes a head portion 211 formed on an end.

When the locking module 10 is assembled on the support stand 100, the mounting poles 321 of the elevating support 32 are received in the corresponding mounting holes 1124, 1144 of the first and second fixing blocks 112, 114. The threaded fasteners 21 engage in the threaded holes 3211 of the mounting poles 321, and the head portions 211 of the threaded fasteners 21 engage in the retaining grooves 1120, 1140, thus fixing the first and second fixing blocks 112, 114 on the elevating support 32. The first and second fixing blocks 112, 114 are positioned opposite each other, and cooperatively define a gap 115 (shown in FIG. 1) between the first and second fixing blocks 112, 114. The recessed portion 1128 of the first fixing block 112 and the recessed portion of the second fixing block 114 cooperatively define a space to enable the rotating member 12 to extend through, and rotate relative to the fixing member 11. The width D (shown in FIG. 1) of the gap 115 is larger than the radial size of the latching member 14, but smaller than the axial size of the latching member 14. Thus, when the latching member 14 is rotated parallel to the gap 115, the latching member 14 can be extended through the gap 115. Alternatively, the fixing member 11 may be fixed on the elevating support 32 by bolting, welding, or adhesive.

When assembling the elevating support 32 on the base seat 31, the rotating portion 122 of the rotating member 12 together with the elastic member 16 and the latching member 14 are inserted through the receiving hole 311 of the base seat 31, the operating member 15 is abutted on the bottom surface of the base seat 31. The latching member 14 is extended through the gap 115. A first end of the elastic member 16 is positioned in the positioning grooves 1126, 1146 of the fixing member 11, the second end of the elastic member 16 abuts on the flange 123 of the rotating member 12. The operating member 15 is pushed by an external force to compress the elastic member 16, thereby enabling the latching member 14 to move on top of the fixing member 11. Then the operating member 15 is rotated by the external force to enable the latching member 14 to align itself to a first set of the latching grooves 1121, 1141 or a second set of the latching grooves 1122, 1142. Subsequently, the external force is released, the rotating member 12 together with the latching member 14 are moved towards the fixing member 11, due to the elastic force generated by the elastic member 16. Thus, two ends of the latching member 14 engage in either the first set of the latching grooves 1121, 1141 or the second set of the latching grooves 1122, 1142. Therefore, the elevating support 32 is stably assembled on the base seat 31.

When disassembling the elevating support 32 from the base seat 31, the operating member 15 is pushed by the external force to compress the elastic member 16, thereby enabling the latching member 14 to disengage from the first set of latching grooves 1121, 1141 or the second set of latching grooves 1122, 1142, and move on top of the fixing member 11. Then the operating member 15 is rotated by the external force to enable the latching member 14 to be aligned with the gap 115. The latching member 14 may be moved out from the gap 115 by pulling the operating member 15. Thus, the elevating support 32 can be easily disassembled from the base seat 31.

In alternative embodiments, the fixing member 11 may be fixed on the base seat 31, the elevating support 32 may define a receiving hole to allow the rotating member 12 together with the elastic member 16 and the latching member 14 to extend through, the operating member 15 abuts on the elevating support 32. The latching member 14 engages in the latching grooves 1121, 1141 or the latching grooves 1122, 1142 of the fixing member 11, thus assembling the elevating support 32 on the base seat 31. The elevating support 32 may define a receiving groove to facilitate operation of the operating member 15.

In other alternative embodiments, one of the first set of the latching grooves 1121, 1141 and the second set of the latching grooves 1122, 1142 may be omitted. One portion of the rotating member 12, such as the flange 123 may be used to operate the latching member 14 and abut on the bottom surface of the base seat 31, thus the operating member 15 may be omitted. The latching member 14 may take different shapes. For example, the latching member 14 may be substantially cruciform. The fixing member 11 may include four fixing blocks cooperatively defining a substantially cruciform gap to allow the latching member 14 to extend through. One of the base seat 31 and the elevating support 32 may define a plurality of engaging grooves, the other one of the base seat 31 and the elevating support 32 may form a plurality of engaging protrusions to engage in the plurality of engaging grooves. Thus, the elevating support 32 may be more stably assembled on the base seat 31. It should be noted that the locking module 10 may be used in other structures to detachably connect two members.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A locking module used for detachably connecting a base seat with an elevating stand, the locking module comprising:
    a fixing member comprising two fixing blocks positioned opposite each other, the two fixing blocks cooperatively defining a gap therebetween, each fixing block defining a latching groove on a top corresponding to each other, each fixing block further defining a mounting hole extending therethrough and a retaining groove at a bottom thereof communicating with the mounting hole, the elevating stand comprising a pair of mounting poles respectively extending through the pair of mounting holes and retained by the pair of retaining grooves;
    a rotating member rotatably extended through the fixing member;
    an elastic member sleeved on the rotating member, and abutting on the fixing member; and
    a latching member fixed on an end of the rotating member, the latching member being extended through the base seat and the gap of the fixing member to engage in the latching groove of the fixing member, thereby connecting the base seat to the elevating stand, wherein when the latching member is rotated to disengage from the latching groove and aligned with the gap, the latching member is moved out from the gap and the base seat by pulling the rotating member, thereby disassembling the elevating support from the base seat.

2. The locking module of claim 1, wherein the latching member is substantially cylindrical; a width of the gap is larger than a radial size of the latching member, and smaller than an axial size of the latching member.

3. The locking module of claim 1, wherein each of the fixing blocks defines a recessed portion having a curved surface corresponding to an outer surface of the rotating member; the recessed portions of the fixing blocks cooperatively define a space to enable the rotating member to extend through and rotate relative to the fixing member.

4. The locking module of claim 1, wherein each of the two fixing blocks defines a positioning groove; the rotating member comprises a rotating portion and a flange formed on an end of the rotating portion; the elastic member is sleeved on the rotating portion, a first end of the elastic member is positioned in positioning grooves, and a second end of the elastic member abuts on the flange.

5. The locking module of claim 4, wherein the rotating portion of the rotating member defines a through hole in an end away from the flange; the latching member is extended through the through hole of the rotating portion.

6. The locking module of claim 1, further comprising an operating member positioned on an end of the rotating member away from the latching member.

7. The locking module of claim 6, wherein the operating member is rotatably connected to the rotating member.

8. The locking module of claim 6, wherein the operating member is fixed on the rotating member or integrally formed with the rotating member.

* * * * *